US011500929B2

(12) United States Patent
Choudhury et al.

(10) Patent No.: US 11,500,929 B2
(45) Date of Patent: Nov. 15, 2022

(54) HIERARCHICAL FEDERATED LEARNING USING ACCESS PERMISSIONS

(71) Applicant: International Business Machines Corporation, Armonk, NY (US)

(72) Inventors: Olivia Choudhury, Cambridge, MA (US); Rohit Ranchal, Austin, TX (US); HariGovind Venkatraj Ramasamy, Round Rock, TX (US); Amarendra Das, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 16/677,339

(22) Filed: Nov. 7, 2019

(65) Prior Publication Data
US 2021/0142223 A1    May 13, 2021

(51) Int. Cl.
*G06F 16/00* (2019.01)
*G06F 16/901* (2019.01)
*G06N 20/20* (2019.01)
*G06N 5/04* (2006.01)

(52) U.S. Cl.
CPC ........... *G06F 16/901* (2019.01); *G06N 20/20* (2019.01); *G06N 5/043* (2013.01)

(58) Field of Classification Search
CPC ....... G06F 16/901; G06N 20/20; G06N 5/043
USPC ................................................. 707/600–899
See application file for complete search history.

(56) References Cited

U.S. PATENT DOCUMENTS

| | | | |
|---|---|---|---|
| 2019/0050746 A1* | 2/2019 | Sanketi | G06N 20/00 |
| 2019/0050749 A1* | 2/2019 | Sanketi | G06F 9/44505 |
| 2019/0141181 A1* | 5/2019 | Wantland | G06F 3/013 |
| 2019/0171978 A1 | 6/2019 | Bonawitz | |
| 2019/0227980 A1 | 7/2019 | McMahan et al. | |
| 2019/0385043 A1* | 12/2019 | Choudhary | G06N 3/084 |
| 2020/0118000 A1* | 4/2020 | Schmidt | G06N 3/04 |

(Continued)

OTHER PUBLICATIONS

Bonawitz et al., "Practical Secure Aggregation for Privacy-Preserving Machine Learning," ACM Conference on Computer and Communications Security, Session E5: Privacy-Preserving Analytics, Oct. 30-Nov. 3, 2017, Dallas, Texas, USA, pp. 1175-1191.

(Continued)

*Primary Examiner* — Michelle N Owyang
(74) *Attorney, Agent, or Firm* — Yee & Associates, P.C.

(57) ABSTRACT

A method, apparatus, system, and computer program product for training a global machine learning model. A hierarchical structure for nodes in which the global machine learning model is located at a primary node in the hierarchical structure is identified. Authorized nodes in which local data is authorized for use in training in the authorized nodes for a local training of local machine learning models are determined. The machine learning models in the authorized nodes are trained using the local data in the authorized nodes to generate local model updates to weights in the local machine learning models. The local model updates to the weights are propagated upward in the hierarchical structure to the global machine learning model, wherein a node receiving local model updates to the weights from nodes from a lower level aggregates the weights in the local model updates received from the nodes in the lower level.

20 Claims, 10 Drawing Sheets

(56) References Cited

U.S. PATENT DOCUMENTS

2021/0090750 A1* 3/2021 Sadilek .................. G16H 50/30
2021/0166157 A1* 6/2021 Bhowmick ............ G06N 20/20
2021/0287080 A1* 9/2021 Moloney ................ G06V 10/96
2022/0108177 A1* 4/2022 Samek .................... G06N 3/08

OTHER PUBLICATIONS

Nishio et al., "Client Selection for Federated Learning with Heterogeneous Resources in Mobile Edge," arXiv:1804.08333v2, Oct. 30, 2018, 7 pages.

Smith et al., "Federated Multi-Task Learning," 31st Conference on Neural Information Processing Systems, Long Beach, California, pp. 1-11.

Vepakomma et al., "Split learning for health: Distributed deep learning without sharing raw patient data," 32nd Conference on Neural Information Processing Systems, Montreal, Canada, pp. 1-7.

Wang et al., "When Edge Meets Learning: Adaptive Control for Resource-Constrained Distributed Machine Learning," arXiv:1804.05271v1, Apr. 14, 2018, 14 pages.

Zhou et al., "Federated Reinforcement Learning," arXiv:1901.08277v2, Jan. 25, 2019, 10 pages.

Barutçuoğlu et al., "A Comparison of Model Aggregation Methods for Regression," 2003, pp. 76-83.

* cited by examiner

HIERARCHICAL FEDERATED LEARNING USING ACCESS PERMISSIONS

BACKGROUND

1. Field

The disclosure relates generally to an improved computer system and, more specifically, to a method, apparatus, system, and computer program product for training machine learning models.

2. Description of the Related Art

Machine learning is a method of data analysis that automates analytical model building. Machine learning algorithms can be used to build models based on training or sample data to perform a specific task. These models, also referred to as machine learning models, can make predictions or decisions without being explicitly programmed to perform the task.

Many different types of machine learning algorithms are present. One type of machine learning approach involves centralizing data on one computer or data center. Another type of machine learning approach involves federated learning. Federated learning enables many computers, tablet computers, mobile phones, or other computing devices to collaboratively learn. With federated learning, a central model can be created by aggregating models trained locally on different data processing systems. Federated learning does not require the different data processing systems to upload data to a central server. In this manner, federated learning can preserve data privacy for the different data processing systems.

SUMMARY

According to one embodiment of the present invention, a method for training a global machine learning model is presented. A hierarchical structure for nodes in which the global machine learning model is located on a primary node in the hierarchical structure is identified by a computer system. Authorized nodes in which local data is authorized for use in training in the authorized nodes for a local training of local machine learning models are determined by the computer system. The machine learning models in the authorized nodes are trained by the computer system using the local data in the authorized nodes to generate local model updates to weights in the local machine learning models. The local model updates to the weights are propagated by the computer system upward in the hierarchical structure to the global machine learning model in the primary node, wherein a node receiving local model updates to the weights from nodes from a lower level aggregates the weights in the local model updates received from the nodes in the lower level.

According to another embodiment of the present invention, a machine model training system comprises a computer system that identifies a hierarchical structure for nodes in which a global machine learning model is located in a primary node in the hierarchical structure. The computer system determines authorized nodes in which local data is authorized in the authorized nodes for a local training of local machine learning models. The computer system trains the machine learning models in the authorized nodes using the local data in the authorized nodes to generate local model updates to weights in the local machine learning models. The computer system propagates the local model updates to the weights upward in the hierarchical structure to the global machine learning model in the primary node, wherein a node receiving local model updates to the weights from nodes from a lower level aggregates the weights in local model updates received from the nodes in the lower level.

According to yet another embodiment of the present invention, a computer program product for training a global machine learning model comprises a computer-readable-storage media with first program code, second program code, third program code, and fourth program code stored on the computer-readable storage media. The first program code is executed to identify a hierarchical structure for nodes in which the global machine learning model is located in a primary node in the hierarchical structure. The second program code is executed to determine authorized nodes in which local data is authorized for use in training in the authorized nodes for a local training of local machine learning models. The third program code is executed to train the machine learning models in the authorized nodes using the local data in the authorized nodes to generate local model updates to weights in the local machine learning models. The fourth program code is executed to propagate the local model updates to the weights upward in the hierarchical structure to the global machine learning model in the primary node, wherein a node receiving local model updates to the weights from nodes from a lower level aggregates the weights in the local model updates received from the nodes in the lower level.

DETAILED DESCRIPTION

Figure 1:
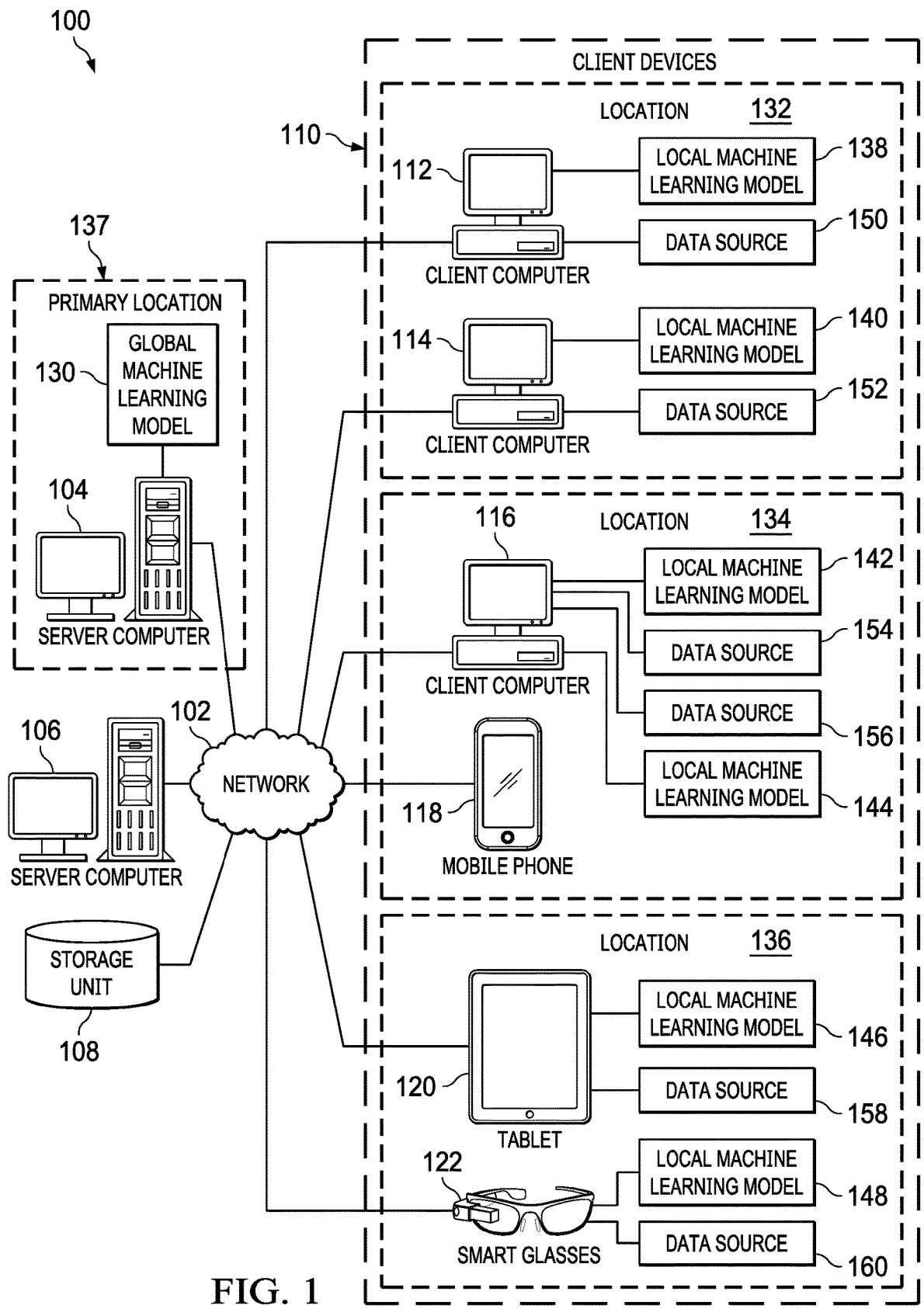
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that federated learning enables building a global model that leverages data residing at different locations without exchanging data between the different sites of locations or with a central server. The illustrative embodiments recognize and take into account that current techniques for federated learning do not take into account the architecture of the different data processing systems.

The illustrative embodiments recognize and take into account that many applications such as healthcare and Internet of things (IoT) applications are located on different data processing systems organized in a hierarchical structure. The illustrative embodiments also recognize and take into account that a hierarchical structure is often unknown and may change depending on the particular use case in which permissions may be based on the particular use case. Further, the illustrative embodiments recognize and take into account that the permissions can also change over time as well as other parameters in a particular data processing system. In other words, the illustrative embodiments recognize and take into account that different data processing systems may or may not be authorized for use for local machine learning depending on the particular use case or permissions that are present at a particular point in time.

The illustrative embodiments also recognize and take into account that current federated learning techniques do not take into account privacy for confidentiality considerations for data used in training. For example, the illustrative embodiments recognize and take into account that current techniques do not consider government regulations, site permissions, user consent, or other factors in handling data that may be confidential or personal.

Thus, the illustrative examples provide a method, apparatus, system, and computer program product for training a global machine learning model. A hierarchical structure for nodes in a computer system is identified by the computer system in which the global machine learning model is located in a primary node in the hierarchical structure. Authorized nodes in the computer system are determined by the computer system in which local data is authorized for use in training in the authorized nodes for a local training of local machine learning models. The machine learning models in the authorized nodes are trained by the computer system using the local data in the authorized nodes in the computer system to generate local model updates to weights in the local machine learning models. The local model updates to the weights are propagated upward in the hierarchical structure by the computer system to a global machine learning model in the primary node. A node, receiving local model updates to the weights from nodes from lower level, aggregates the weights in the local model updates received from the nodes in the lower level.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, global machine learning model 130 in server computer 104 can be trained using federated learning. As depicted, the training can be performed locally on one or more of client devices 110. Nodes can be present on client devices 110. Each client device can have one or more nodes. A node is a data source that contains data that can be used to train a machine learning model. A data source can be, for example, a collection of files, a database, a table, a spreadsheet, a collection of documents, or other suitable types of data that can be used to train the machine learning model.

In this illustrative example, a hierarchical structure is present for client devices 110. In this example, the hierarchical structure is based on physical locations. For example, client computer 112 and client computer 114 are in location 132; client computer 116 and mobile phone 118 are in location 134; and tablet computer 120 and smart glasses 122 are in location 136. In other illustrative examples, the hierarchical structure can be based on logical organizations or a combination of logical organizations and physical locations.

In this illustrative example, the locations are nodes in the hierarchical structure. As depicted, primary location 137 can be the root or primary node in the hierarchy. Location 132, location 134, and location 136 are nodes in the next level in the hierarchy below primary location 137. In this depicted example, two levels are present in the hierarchical structure. In other illustrative examples, other numbers of levels can be present such as three levels, seven levels, or some other number of levels in a hierarchy of locations.

In this illustrative example, the hierarchical structure is used to organize data for an organization. As depicted, the hierarchical structure comprises locations as nodes in which data is present in the nodes. In this example, the data is maintained within the hierarchical structure.

As depicted, local machine learning models are present in client devices 110 in location 132, location 134, and location 136. For example, local machine learning model 138 is located in client computer 112; local machine learning model 140 is located in client computer 114; local machine learning model 142 and local machine learning model 144 are located in client computer 116; local machine learning model 146 is located in tablet computer 120; and local machine learning model 148 is located in smart glasses 122. Data sources are present in these client computers for training these local machine learning models.

In this illustrative example, a machine learning model is not present in mobile phone 118 in client devices 110. As depicted, mobile phone 118 does not have a data source for use in training a global machine learning model or the data sources available for training a local machine learning model.

In this illustrative example, these local machine learning models can be copies of global machine learning model 130. In other words, these local machine learning models can have the weights found in global machine learning model 130.

As depicted, each of these local machine learning models can be trained using data sources in the nodes in the hierarchical structure. For example, data source 150 is located in client computer 112 and data source 152 is located in client computer 114 in location 132. Data source 154 and data source 156 are located in client computer 116 are located in location 134; and data source 160 is located in smart glasses 122 in location 136.

In this illustrative example, the local machine learning is performed locally on the nodes in client devices 110. In the process for performing local training of machine learning models, the hierarchical structure of locations is determined.

A determination is made as to which locations are authorized nodes. An authorized node is a node that is authorized for use in training a local learning machine model. For example, an authorized node is a node in which data is accessible or usable for training the local machine learning model for the node. An authorized node is a node in which access is allowed to more data sources in the node.

In the illustrative example, the determination of whether a node is an unauthorized node can be made using a number of different considerations. For example, an access control list can be used to determine whether access to a node is authorized. As another example, a policy can be applied to the node. The policy contains one or more rules regarding the use of data sources in the node. For example, personal or confidential information can be collected about users only when the users have provided consent for the collection and sharing of health information. As a result, data sources in nodes cannot be accessed and used for a training machine learning model unless consent is present with respect to data in the data sources for users. The consent can be obtained ahead of time with the proper disclosure and consent forms for privacy rules and regulations. Thus, personal or other confidential information about the user is not collected or shared without the user opting in by providing consent to the collection and use of the personal information.

As depicted, data source 150, data source 152, data source 154, data source 156, data source 158, and data source 160 are located in locations that are authorized nodes. The local machine learning models in these locations can be locally trained using local data in these data sources. As depicted, each local machine learning model is trained using a data source. As a result, mixing or comingling of data in between data sources does not occur. For example, if the data sources are databases, the training of each local machine learning model using a single database avoids mixing data between databases in this illustrative example. Avoiding combining data in different data sources can avoid privacy issues with respect to personal and confidential information.

After training of the local machine learning models is completed in client devices 110, the updates to weights in these local machine learning models can be propagated up to global machine learning model 130. In this manner, global machine learning model 130 can benefit from the training of local machine learning models in client devices 110 without needing to access or use the data.

In this illustrative example, updates to weights in client devices 110 in each location are aggregated. For example, each location can aggregate weights from local machine learning models in the location. Then, each location can send the aggregated weights to primary location 137. These aggregated weights are aggregated to form the weights for global machine learning model 130. In this manner, weights can be aggregated on each level of the hierarchy.

In this illustrative example, training can be repeated a number of times. When subsequent training is performed, the weights from global machine learning model 130 can be sent back down to the local machine learning models for additional training. When the additional training is completed, the updated weights are propagated upwards to global machine learning model 130.

Figure 2:
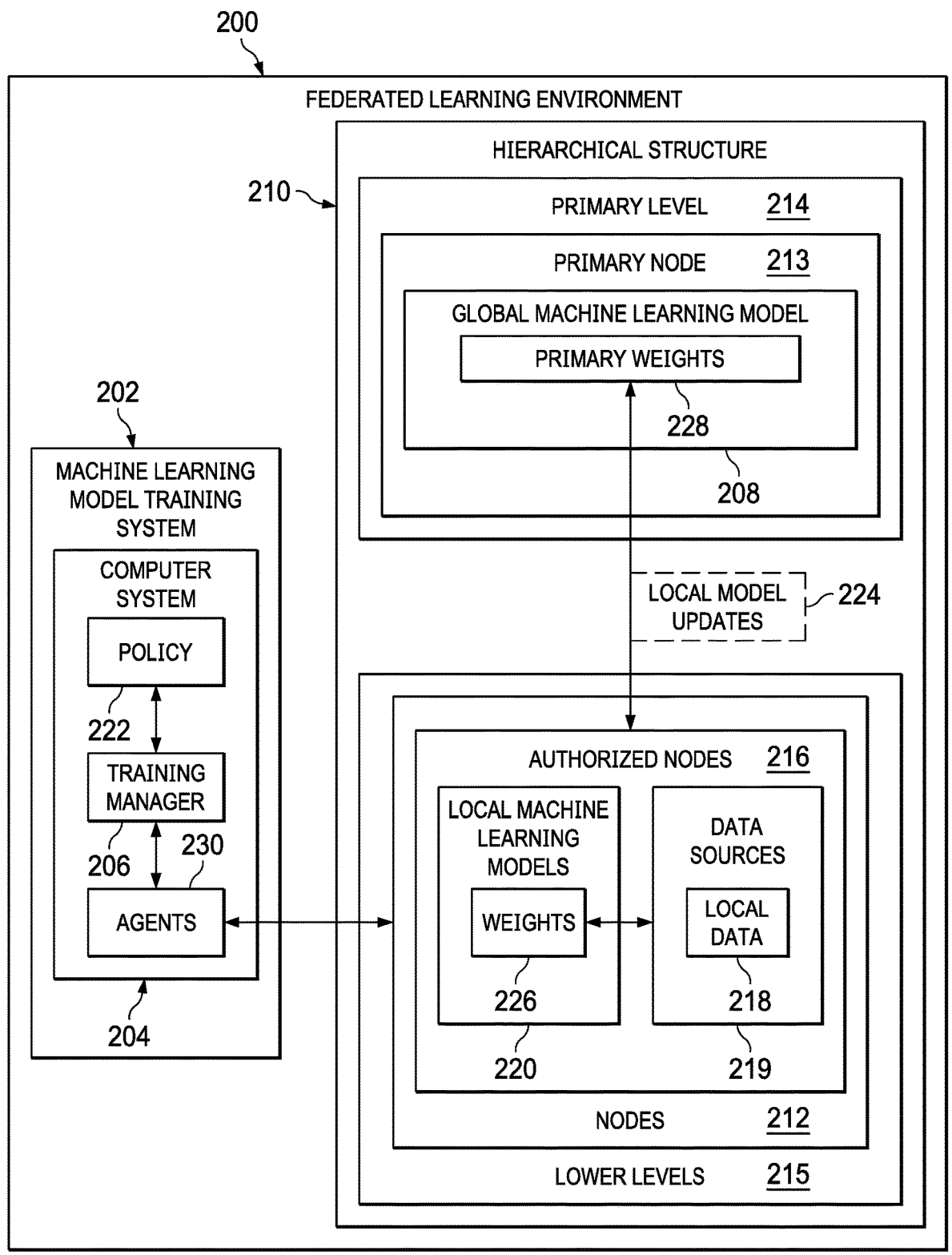
FIG. 2 is a block diagram of a federated learning environment in accordance with an illustrative embodiment.

With reference now to FIG. 2, a block diagram of a federated learning environment is depicted in accordance with an illustrative embodiment. In this illustrative example, federated learning environment 200 includes components that can be implemented in hardware such as the hardware shown in network data processing system 100 in FIG. 1.

In this illustrative example, machine learning model training system 202 can be used to train global machine learning model 208. In this illustrative example, machine learning model training system 202 comprises computer system 204 and training manager 206 in computer system 204. Training manager 206 can train global machine learning model 208. Training manager 206 can be implemented in software, hardware, firmware, or a combination thereof. When software is used, the operations performed by training manager 206 can be implemented in program code configured to run on hardware, such as a processor unit. When firmware is used, the operations performed by training manager 206 can be implemented in program code and data and stored in persistent memory to run on a processor unit. When hardware is employed, the hardware may include circuits that operate to perform the operations in training manager 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform number of operations. The device can be reconfigured at a later time or can be permanently configured to perform number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

In this illustrative example, training manager 206 in computer system 204 identifies hierarchical structure 210 for nodes 212 in which global machine learning model 208 is located in primary node 213 in primary level 214 in hierarchical structure 210. Nodes 212 are locations that can be organized with hierarchical structure 210. Nodes 212 are in a set of lower levels 215 in hierarchical structure 210.

The locations can be selected from at least one of a geographic location, a building, a data center, a computer, smart glasses, a tablet computer, a client computer, a server computer, a computing device, an Internet of Things device, or other suitable locations where data can be located. In this illustrative example, primary node 213 in primary level 214 can be a root node or a node that is the highest-level node with respect to other ones of nodes 212 in the set of lower levels 215 in hierarchical structure 210.

For example, hierarchical structure 210 can be for an organization that operates in different geographic locations. The primary node can be located in the headquarters of the organization. A second tier of nodes are locations such as cities in which the organization operates. A third tier of nodes can be, for example, sub-locations such as buildings or campuses within the cities.

In another illustrative example, hierarchical structure 210 can describe a hierarchy of computing devices. For example, primary node 213 is a location such as a server computer while nodes 212 in lower levels are locations such as client devices. The client devices can be organized into multiple levels base on functionality or interactions between client devices. In this illustrative example, local data 218 is present in one or more of primary node 213 and nodes 212 having hierarchical structure 210.

Training manager 206 determines authorized nodes 216 in which local data 218 is authorized in the authorized nodes 216 for a local training of local machine learning models 220. Authorized nodes 216 in nodes 212 that contain local data 218 in data sources 219 can be used for local training of local machine learning models 220. Determining which ones of nodes 212 are authorized nodes 216 can be performed using policy 222. In this illustrative example, policy 222 is a set of rules that can be applied to nodes 212 to determine whether nodes 212 are authorized nodes 216.

Policy 222 can define data access permissions and can be derived from various sources including at least one of a federal regulation, a statute, a site permission, an access control lists, a security rule, a cyber security rule, a user consent, or other sources. Policy 222 can be used to determine whether local data 218 in data sources 219 in nodes 212 can be used to train local machine learning models 220.

In this illustrative example, a data source is a source of data such as local data 218. For example, a data source is an organization of data or a collection of data. A data source can be, for example, a data structure, a database, a collection of documents, a grouping of records, a file, a table, a spreadsheet, a linked list, a website, or other sources of data.

As depicted, training manager 206 trains local machine learning models 220 in authorized nodes 216 using local data 218 in authorized nodes 216 to generate local model updates 224 to weights 226 in local machine learning models 220.

As depicted, local data 218 can be obtained from data sources 219 in a set of nodes 212. In the illustrative example, a node in nodes 212 may contain more than one data source and some nodes in nodes 212 may not contain data sources.

In the illustrative example, training manager 206 propagates local model updates 224 to weights 226 upward in hierarchical structure 210 to global machine learning model 208 in primary node 213 in primary level 214. For example, a node receiving local model updates 224 to weights 226 from nodes from a lower level, aggregates weights 226 in local model updates 224 received from the nodes in the lower level.

In this illustrative example, weights 226 in their aggregated form are aggregated at primary node 213 to form primary weights 228 for global machine learning model 208. As a result, global machine learning model 208 includes primary weights 228 that are aggregations of weights 226 from local machine learning models 220 trained in local data 218 in data sources 219 in authorized nodes 216 in hierarchical structure 210. The weights in global machine learning model 208 can also be updated through training using data local to global machine learning model 208.

In the illustrative example, the processes of identifying hierarchical structure 210, determining authorized nodes 216, training local machine learning models 220, and propagating local model updates 224 to weights 226 to global machine learning model 208 can be repeated as needed. A new round of training using the steps can be performed by training manager 206 to repeat training when at least one of a set of convergence criteria for global machine learning model 208 is unsatisfied, new data is present in hierarchical structure 210, hierarchical structure 210 changes, or policy 222 for data access permissions changes.

When training is repeated, training manager 206 can propagate primary weights 228 in global machine learning model 208 to local machine learning models 220 in authorized nodes 216 in hierarchical structure 210 prior to repeating training. As depicted, primary weights 228 are used when locally training local machine learning models 220.

In this illustrative example, training manager 206 can perform steps in nodes 212 and primary node 213 by being distributed to these different locations. In another example, agents 230 in computer system 204 can be distributed to client devices in nodes 212 and controlled by training manager 206. These agents can perform steps such as local training of local machine learning models 220, local model updates to weights 226, aggregating weights 226, and other suitable actions for performing federated learning.

Computer system 204 can be configured to perform at least one of the steps, operations, or actions described in the different illustrative examples using software, hardware, firmware, or a combination thereof. As a result, computer system 204 operates as a special purpose computer system in which training manager 206 in computer system 204 enables training a machine model learning system taking into account a structural hierarchy of location in which training of local machine learning models occur. In particular, training manager 206 transforms computer system 204 into a special purpose computer system as compared to currently available general computer systems that do not have training manager 206.

Figure 3:
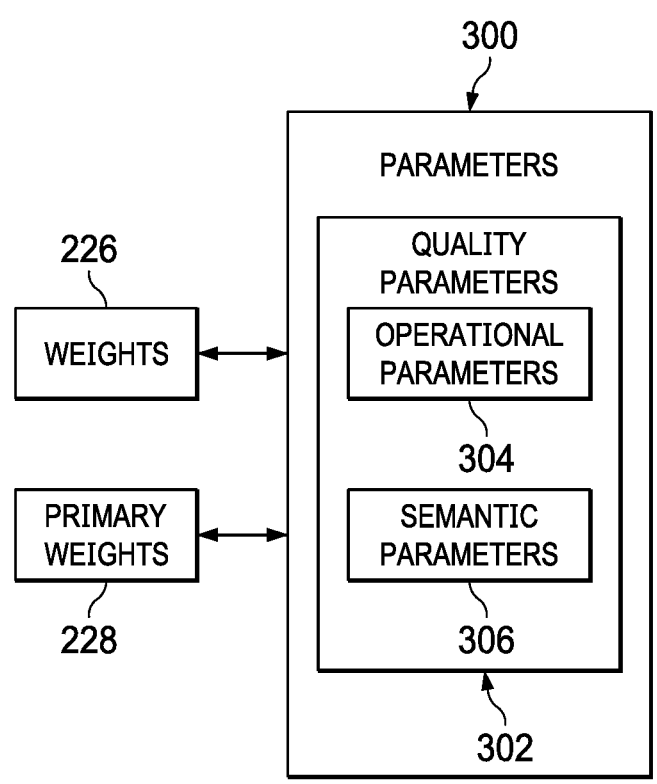
FIG. 3 is a block diagram of weights in accordance with an illustrative embodiment.

With reference next to FIG. 3, a block diagram of weights is depicted in accordance with an illustrative embodiment. In the illustrative examples, the same reference numeral may be used in more than one figure. This reuse of a reference numeral in different figures represents the same element in the different figures.

In this illustrative example, weights 226 are weights for parameters 300 and primary weights 228 can be quality parameters 302 for data in contrast to parameters about the quantity of data that are currently used.

In this illustrative example, quality parameters 302 can include operational parameters 304, semantic parameters 306, or some combination thereof. An operational parameter in operation parameters 304 can be one of reliability, a rate of generation, and a timeliness of the data. A semantic parameter in semantic parameters 306 can be one of relevance, distribution, and a trustworthiness of the data.

Weights 226 and primary weights 228 can comprise at least one of a quality parameter for the data, an operational parameter for the data, or a semantic parameter for the data. These parameters can change during different rounds of training. The weight can be dynamically adjusted based on characteristics of nodes 212, local data 218, or a combination thereof.

Thus, the illustrative example can use the hierarchal structure of nodes 212 for federated learning by dynamically determining the hierarchy of nodes 212, determining authorized nodes 216 for training based on policy 222 that defines data access permissions such that local machine learning models 220 are at least one of shared, trained, or aggregated. Further underlying characteristics of nodes 212 and the data in nodes 212 can be considered while aggregating the local model updates to update the global model. These characteristics are defined by parameters 300 and may vary during multiple rounds of training of global machine learning model 208.

The illustration of federated learning environment 200 and the different components in federated learning environment 200 in FIGS. 1-3 are not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
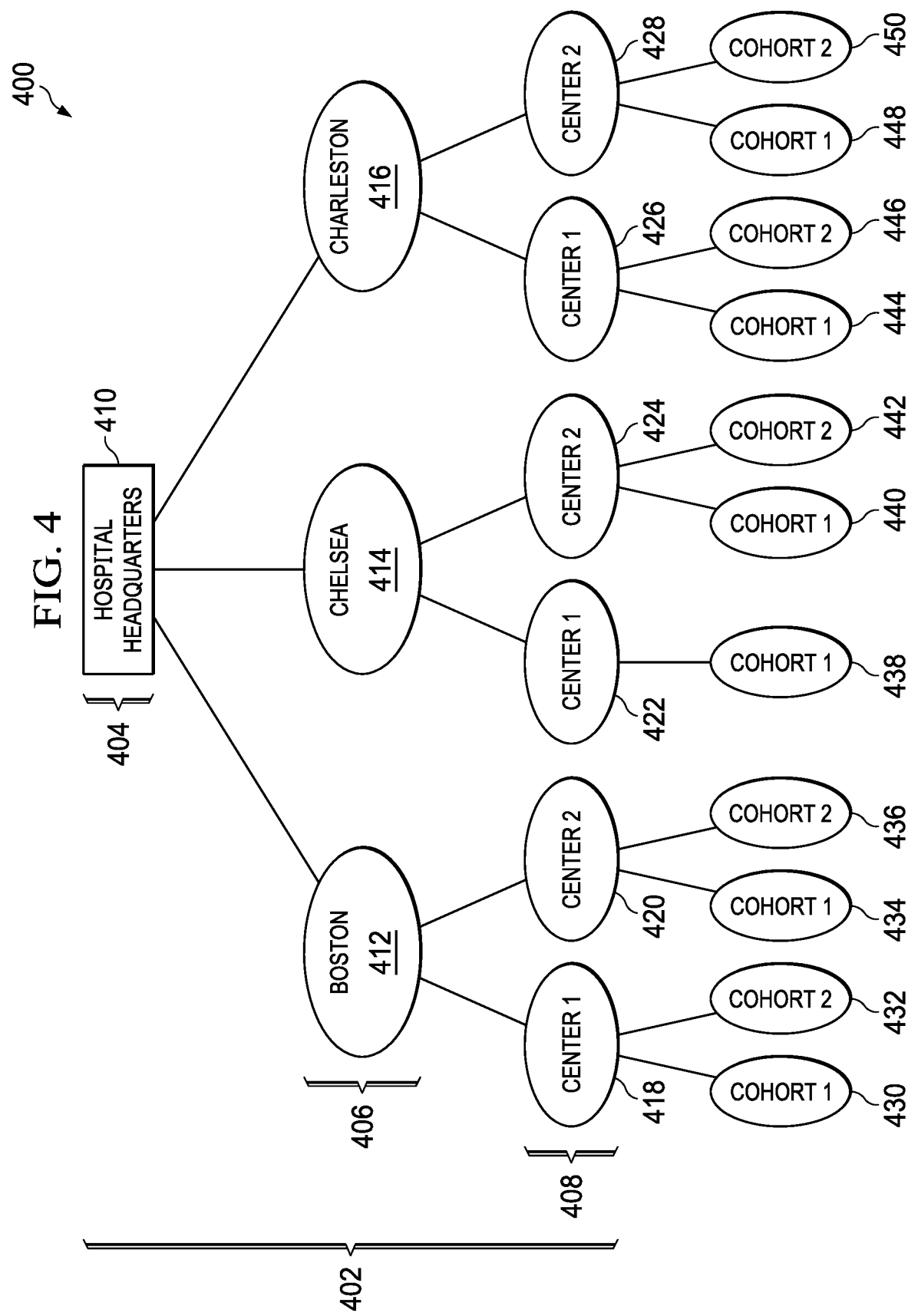
FIG. 4 is an illustration of a hierarchical structure used for training a global machine learning model using local machine learning models in accordance with an illustrative embodiment.

With reference now to FIG. 4, an illustration of a hierarchical structure used for training a global machine learning model using local machine learning models is depicted in accordance with an illustrative embodiment. As depicted, hierarchical structure 400 is a structure in which data is maintained by a hospital. As depicted, the nodes represent locations for the hospital.

As depicted, hierarchical structure 400 comprises nodes 402 organized into three levels. Hierarchical structure 400 is an example of one implementation for hierarchical structure 210 shown in block form in FIG. 2. As depicted, nodes 402 are organized into primary level 404, secondary level 406, and tertiary level 408.

In this illustrative example, hospital headquarters 410 is a primary node located in primary level 404. Then primary node, hospital headquarters 410, can be a headquarters for a business location for the hospital. In this example, the primary node is the location in which a global machine learning model, such global machine learning model 208 in FIG. 2, can be located.

As depicted, secondary level 406 comprises Boston 412, Chelsea 414, and Charleston 416 as nodes representing locations. These nodes are locations in cities in which the hospital operates. The nodes in tertiary level 408 comprise Center 1 418 and Center 2 420, which are operating centers in Boston 412. Center 1 422 and Center 2 424 are operating centers in Chelsea 414; and Center 1 426 and Center 2 428 are operating centers in Charleston 416. These centers are locations within the different cities in which the hospital operates.

Data for the hospital is maintained in hierarchical structure 400. In this illustrative example, the data is organized into collections of data referred to as "cohorts". As depicted, the data comprises Cohort 1 430 and Cohort 2 432 in Center 1 418; Cohort 1 434 and Cohort 2 436 in Center 2 420; Cohort 1 438 in Center 1 422; Cohort 1 440 and Cohort 2 442 in Center 2 424; Cohort 1 444 and Cohort 2 446 in Center 1 426; and Cohort 1 448 and Cohort 2 450 in Center 2 428.

In this illustrative example, hierarchical structure 400 is an identified global machine learning model located in hospital headquarters 410. When hierarchical structure 400 is identified, the determination of which nodes are authorized is made. In this illustrative example, all of nodes 402 in hierarchical structure 400 are authorized nodes.

This training of the global machine learning model in hospital headquarters 410 is performed using local machine learning models in the different centers. In this illustrative example, each cohort is training data for a single machine learning model. A local machine learning model is placed in the center in which each cohort is maintained. In the illustrative example, each cohort is used to train a local single machine learning model that is in the same location as the cohort. By using a single machine learning model for each cohort, concerns with respect to privacy, security, confidentiality, and other concerns may be reduced by performing the training of local machine learning models rather than sending data out of a particular location for training.

In the illustrative example, health information can be used for local training only when the users have provided consent for the collection and use of health information. In this illustrative example, the consent is obtained ahead of time with the proper disclosure and consent forms for privacy rules and regulations, such as the Health Insurance Portability and Accountability Act of 1996. In the illustrative example, health information is not collected or shared unless a user has opted in to share their health information. Further, any other personal information about the user is not collected or shared without the user opting in by providing consent to the collection and use of the personal information. For example, audio recordings or video recordings of an occupant are not collected or shared without the user opting in to the collection or sharing of this type of information. In these illustrative examples, consent may be easier to obtain when it is made clear that the information about the users is not shared or transferred to other locations.

In this illustrative example, the initial weights for the local machine learning models can be based on the initial weights in the global machine learning model. In other illustrative examples, weights can be selected based on characteristics of at least one of the node or the data that is to be used for local machine learning model training in the node.

Once local machine model training is performed, local model updates are present for the weights in the local machine learning models that have been trained using the local data in the cohorts. These local model updates to the weights are propagated upwards in hierarchical structure 400 to the global machine learning model located in hospital headquarters 410. In this illustrative example, when more than one local model update to weights is received at a node, the node aggregates the weights in local model updates. This aggregation can comprise averaging the weights to generate aggregated weights for the local model updates. Thus, the aggregated weights for local model updates in the node performing aggregation can be propagated upwards to a higher level.

For example, Center 1 418 receives first local model updates for weights generated by a first local machine learning model trained using local data in Cohort 1 430, and second local model updates for weights generated by a second local machine learning model trained using local data in Cohort 2 432. The first local model updates for weights and the second local model updates for the weights are aggregated by a computer or other suitable data processing center in Center 1 418. As another example, when Chelsea 414 receives aggregated weights for local model updates aggregated by Center 1 422 and aggregated weights for local model updates aggregated by Center 2 424, a data processing system in Chelsea 414 aggregates the weights in these aggregated local model updates and passes the aggregation of the weights to hospital headquarters 410. These aggregated weights are aggregated with other aggregated weights received from Boston 412 and Charleston 416 to form primary weights for the global machine learning model in hospital headquarters 410. In this manner, the global machine learning model in hospital headquarters 410 can be generated using weights obtained from local training of local machine learning models in which these weights are aggregated as the weights are passed up hierarchical structure 400 to hospital headquarters 410.

Further aggregations can be performed until all the weights are aggregated in the primary node, hospital headquarters 410. At this point, weights are placed into the global machine learning model located in hospital headquarters 410. Training can be repeated any number of times until selected goals are reached. For example, training can continue until a set of convergence criteria for the global machine learning model is satisfied. Further, even when the set of convergence criteria are met, further training can be performed when changes occur such as new data is present in hierarchical structure 400 or hierarchical structure 400 changes.

Each time a new round of training is performed, hierarchical structure 400 is identified in case changes have occurred to hierarchical structure 400. These changes can include an addition of a new node, a removal of a node, or some other change to hierarchical structure 400.

With a repeating training of the global machine learning model, a determination of authorized nodes is determined. For example, in FIG. 5, an illustration of a hierarchical structure used for training a global machine learning model in which authorized nodes have changed is depicted in accordance with an illustrative embodiment. As depicted in this figure, hierarchical structure 400 is not changed but authorized nodes in hierarchical structure 400 have changed.

In this illustrative example, specific centers may have data access permissions that can change over time. In this illustrative example, data access permissions for Center 2 420 in Boston 412 have changed such that Center 2 420 is no longer an authorized node. As a result, the data in Cohort 1 434 and Cohort 2 436 are no longer available for training local machine learning models.

Additionally, Cohort 2 442 in Center 2 424 in Chelsea 414 is no longer available for use in training a local machine learning model. The change can be based on a data access permissions change. For example, the data access permissions change can occur because of a change in security rules, the change in consent from users, or other changes.

As depicted in this figure, Charleston 416 is no longer available for use in training machine learning models. As a result, all of the nodes, Center 1 426 and Center 2 428, below Charleston 416 have also become unavailable including the local data in the cohorts in those nodes.

In this example, local machine learning models are locally trained in Center 1 418, Center 1 422, and Center 2 424 using the cohorts that are available in those centers. The results of updates to weights in this local training are propagated back up hierarchy 400 to the global machine learning model in hospital headquarters 410.

Figure 6:
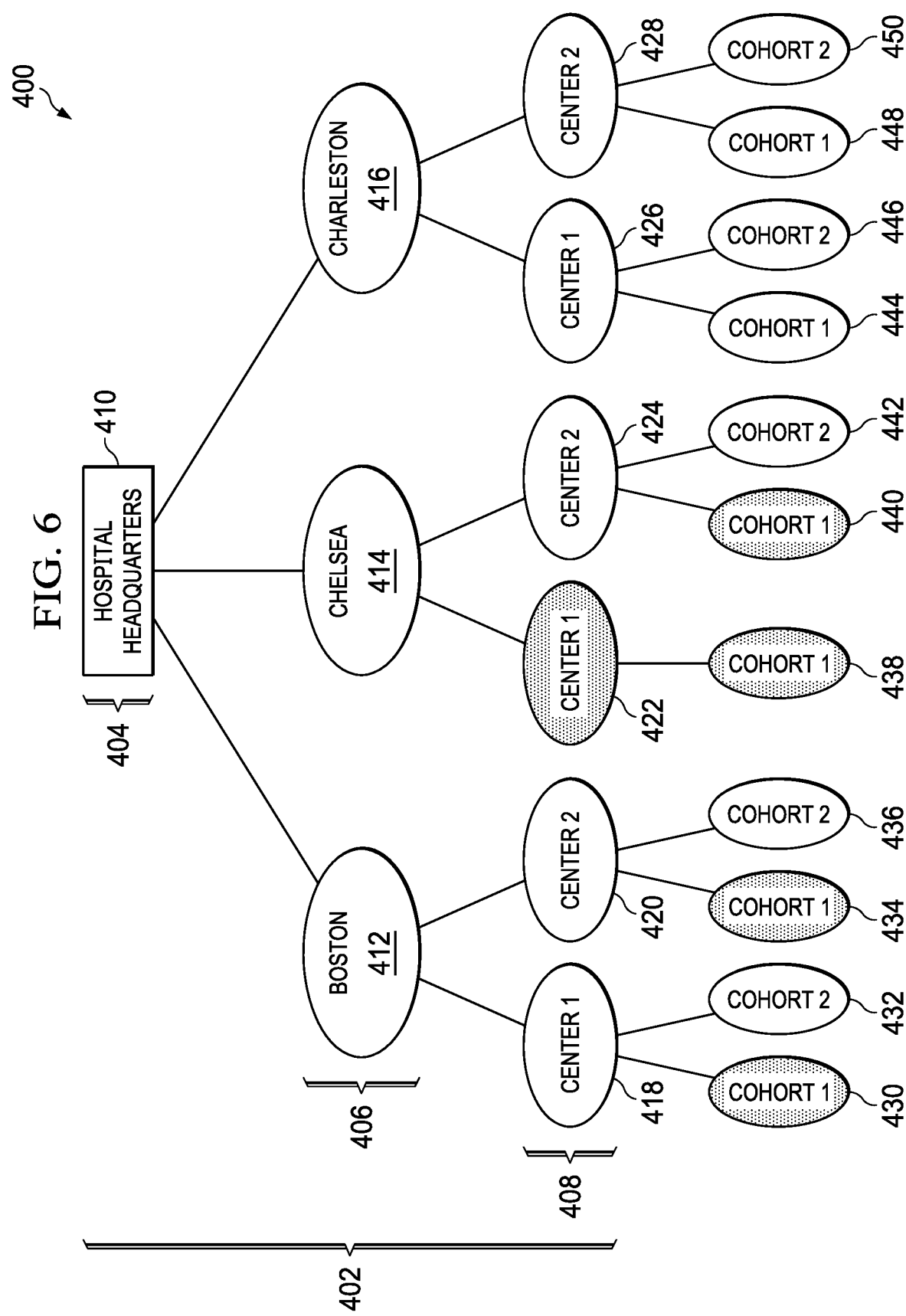
FIG. 6 is another illustration of a hierarchical structure used for training a global machine learning model in which authorized nodes have changed in accordance with an illustrative embodiment.

With reference next to FIG. 6, another illustration of a hierarchical structure used for training a global machine learning model in which authorized nodes have changed is depicted in accordance with an illustrative embodiment. As depicted in this figure, hierarchical structure 400 is not changed but authorized nodes in hierarchical structure 400 have changed.

In this figure, the determination of authorized nodes results in Center 1 422 in Chelsea 414 becoming an unauthorized node. As a result, the data in Cohort 1 438 becomes unavailable for use in training a local machine learning model. In this example, the other nodes are available for training local machine learning models. However, some of these nodes include the data in cohorts that are unavailable. For example, Cohort 1 430 is unavailable for use in local training while Cohort 2 432 is available in Center 1 418. As another example, Cohort 1 434 is unavailable for use in local training while Cohort 2 436 is available in Center 2 420. Further, Cohort 1 440 is unavailable for use in local training while Cohort 2 442 is available in Center 2 424.

Figure 5:
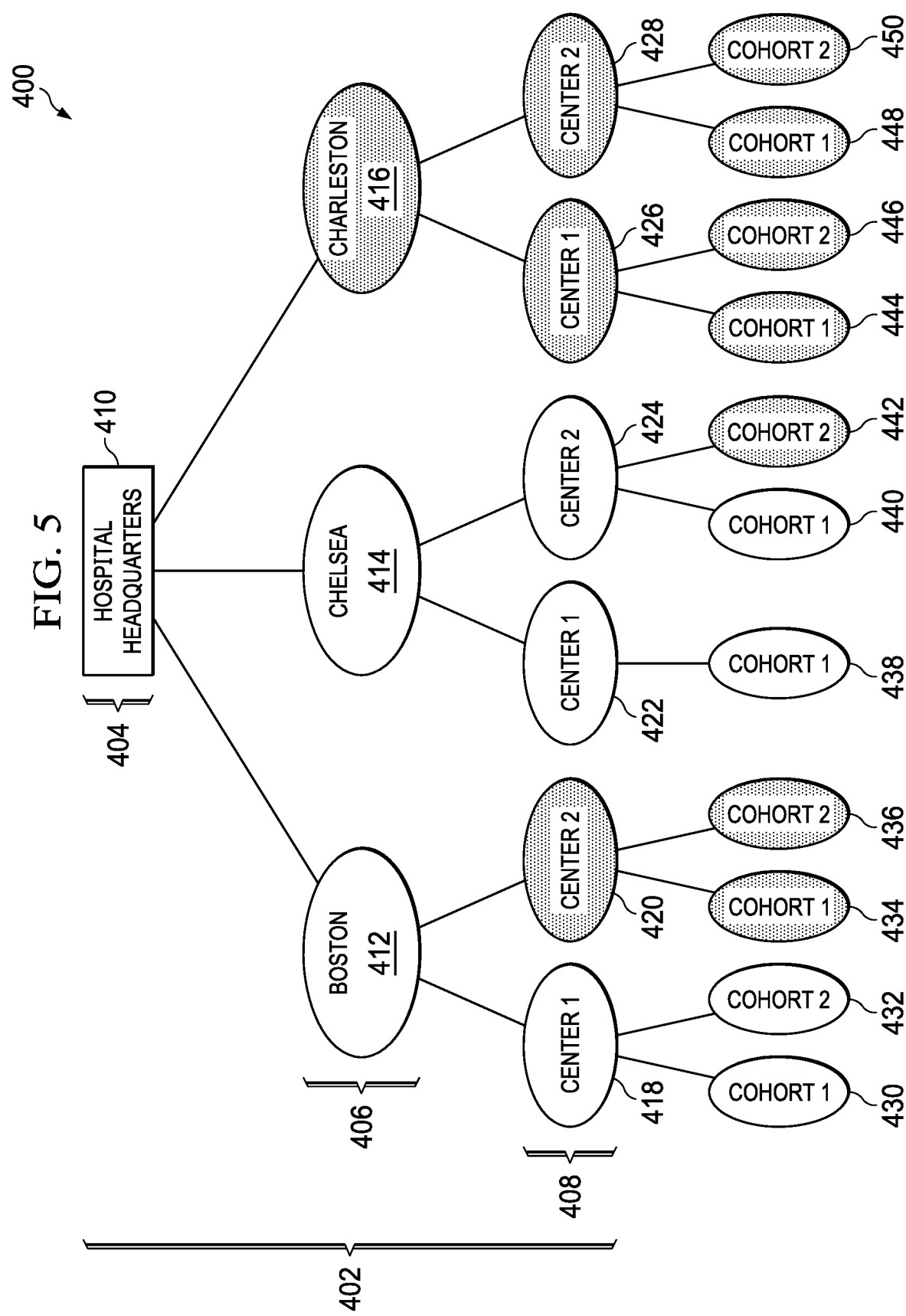
FIG. 5 is an illustration of a hierarchical structure used for training a global machine learning model in which authorized nodes have changed in accordance with an illustrative embodiment.

The illustration of hierarchical structure 400 in FIGS. 4-6 are presented for purposes of illustrating one manner in which hierarchical structure 210 in FIG. 2 can be implemented. This illustration is not meant to limit the manner in which other structures can be implemented. For example, other hierarchical structures can have other numbers of nodes and levels of hierarchy. For example, a hierarchical structure can have five levels of hierarchy. Further, another hierarchical structure can be used for another type of organization such as a charity. In yet another illustrative example, the hierarchical structure can be for locations in the form of data processing systems in which data is located instead of at physical locations.

Figure 7:
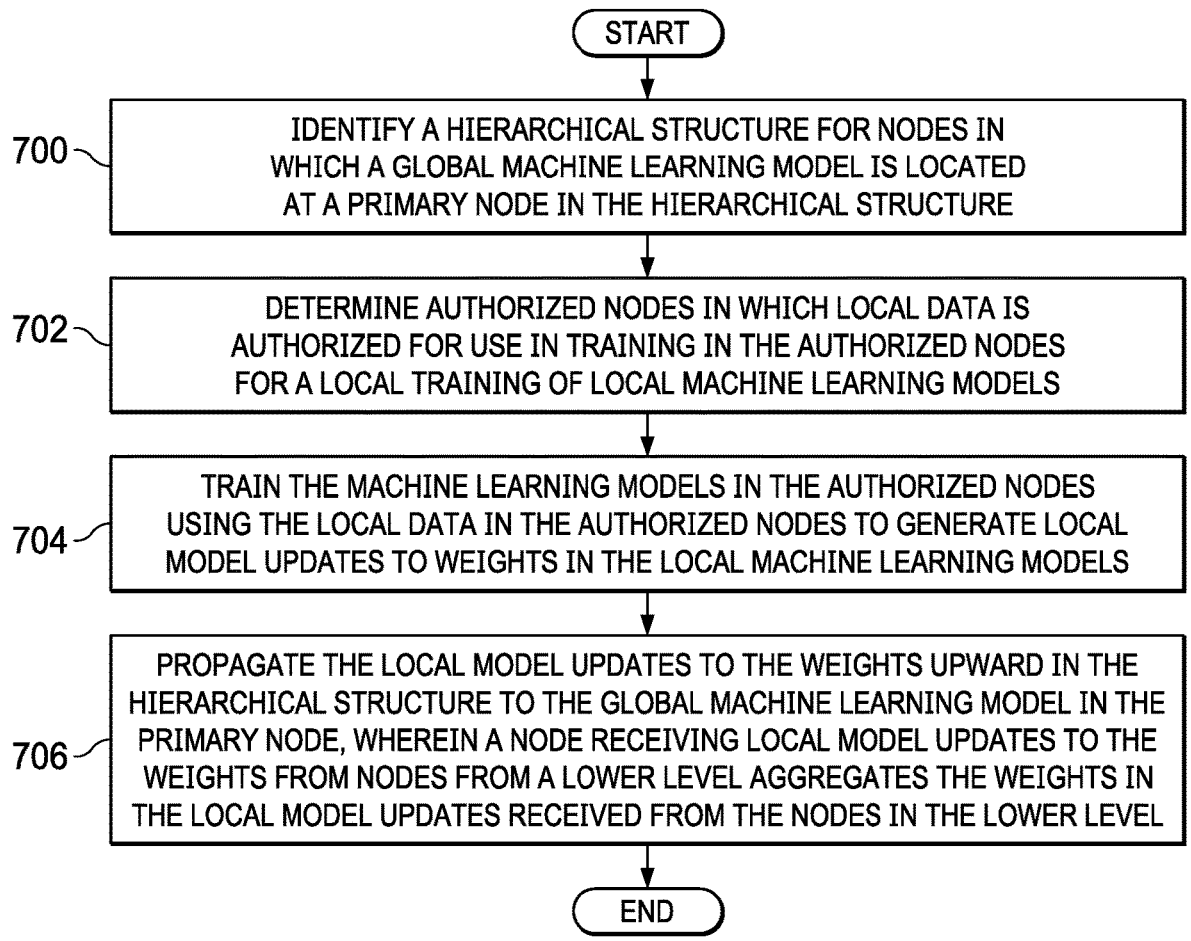
FIG. 7 is a flowchart of a process for training a global machine learning model in accordance with an illustrative embodiment.

Turning next to FIG. 7, a flowchart of a process for training a global machine learning model is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented by training manager 206 in computer system 204 in FIG. 2.

The process begins by identifying a hierarchical structure for nodes in which a global machine learning model is located at a primary node in the hierarchical structure (step 700). The process determines authorized nodes in which local data is authorized for use in training in the authorized nodes for a local training of local machine learning models (step 702).

The process trains the machine learning models in the authorized nodes using the local data in the authorized nodes to generate local model updates to weights in the local machine learning models (step 704). The process propagates the local model updates to the weights upward in the hierarchical structure to the global machine learning model in the primary node, wherein a node receiving local model updates to the weights from nodes from a lower level aggregates the weights in the local model updates received from the nodes in the lower level (step 706). The process terminates thereafter.

Figure 8:
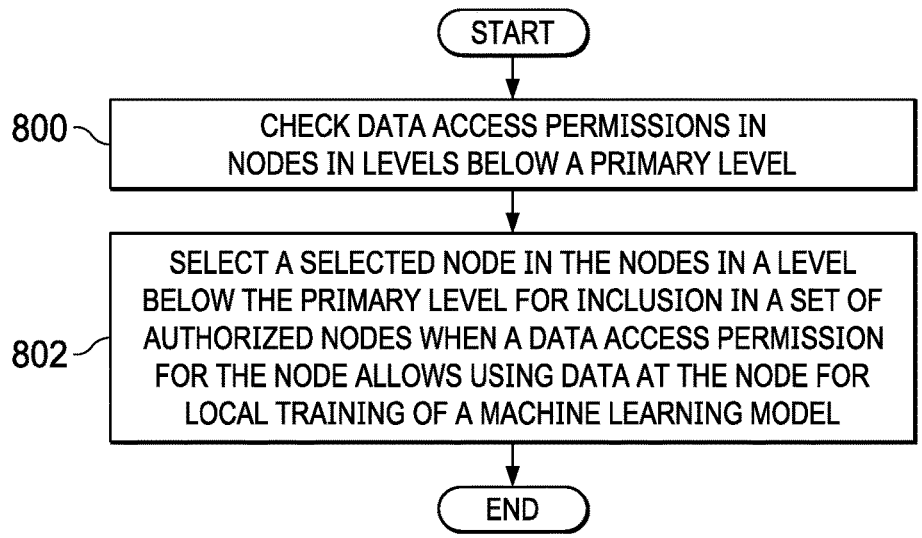
FIG. 8 is a flowchart of a process for determining authorized nodes in accordance with an illustrative embodiment.

With reference next to FIG. 8, a flowchart of a process for determining authorized nodes is depicted in accordance with an illustrative embodiment. The process illustrated in FIG. 8 is an example of one manner in which step 702 in FIG. 7 can be implemented.

The process begins by checking data access permissions in nodes in levels below a primary level (step 800). The check can be performed using a policy such as policy 222 in FIG. 2. The process selects a selected node in the nodes in a level below the primary level for inclusion in the set of authorized nodes when a data access permission for the node allows using data at the node for local training of a machine learning model (step 802). The process terminates thereafter.

Figure 9:
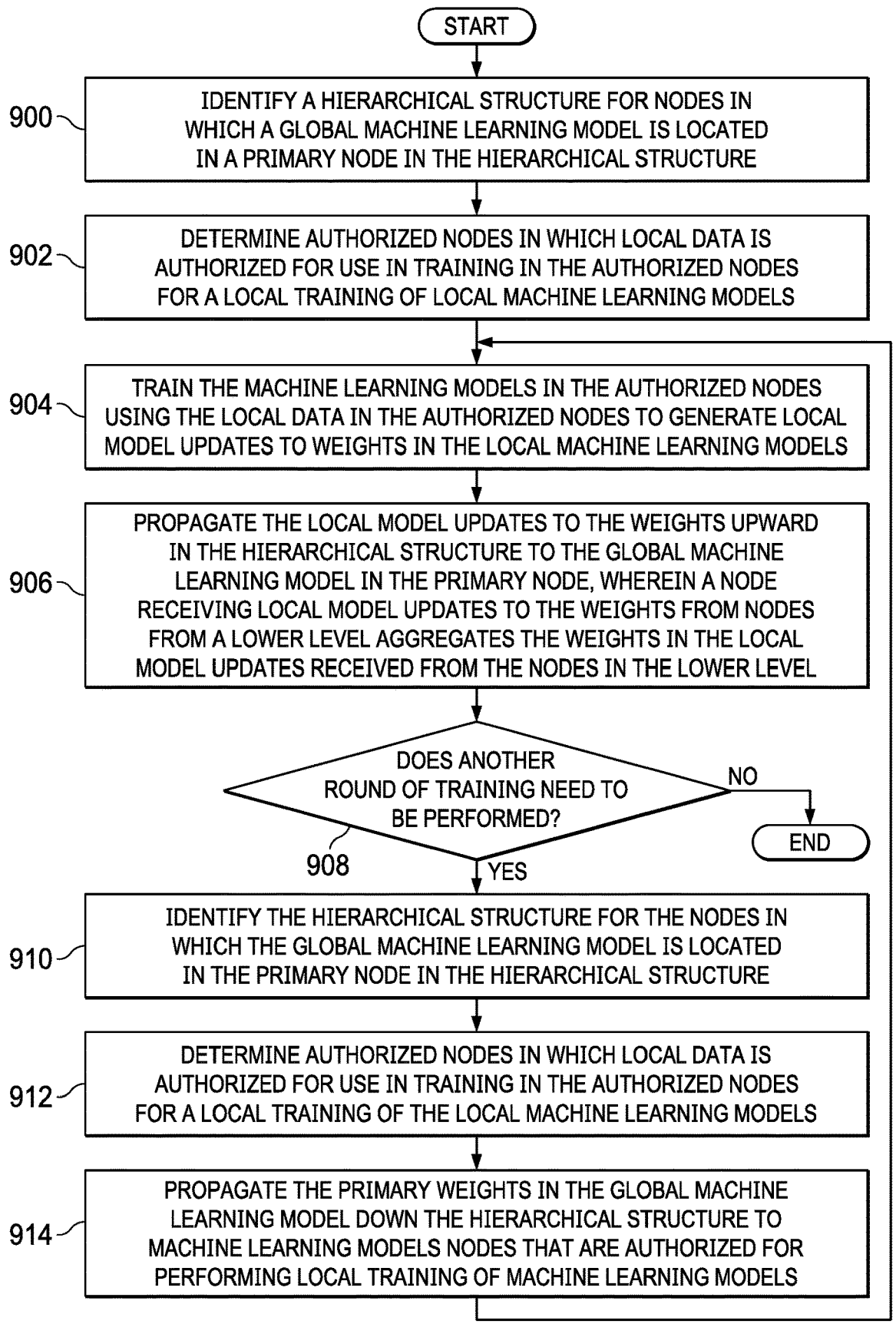
FIG. 9 is a more detailed flowchart of a process for training a global machine learning model in accordance with an illustrative embodiment.

Turning next to FIG. 9, a more detailed flowchart of a process for training a global machine learning model is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in by training manager 206 in computer system 204 in computer system 204 in FIG. 2.

The process beings by identifying a hierarchical structure for nodes in which a global machine learning model is located in a primary node in the hierarchical structure (step 900). The process determines authorized nodes in which local data is authorized for use in training in the authorized nodes for a local training of local machine learning models (step 902).

The process trains the machine learning models in the authorized nodes using the local data in the authorized nodes to generate local model updates to weights in the local machine learning models (step 904). The process propagates the local model updates to the weights upward in the hierarchical structure to the global machine learning model in the primary node, wherein a node receiving local model updates to the weights from nodes from a lower level aggregates the weights in the local model updates received from the nodes in the lower level (step 906).

A determination is made as to whether another round of training needs to be performed (step 908). The determination in step 908 can be made in a number of different ways. For example, a determination can be made as to whether at least one of a set of convergence criteria for the global machine learning model is unsatisfied, new data is present in the hierarchical structure, or the hierarchical structure changes.

If another round of training is to be performed, the process identifies the hierarchical structure for the nodes in which the global machine learning model is located in the primary node in the hierarchical structure (step 910). This step is performed in case changes have occurred in the hierarchical structure since the last training round.

The process determines authorized nodes in which local data is authorized for use in training in the authorized nodes for a local training of local machine learning models (step 912). Step 912 can determine whether changes in permissions have occurred since the last training round to determine whether the makeup of authorized nodes has changed.

The process propagates the primary weights in the global machine learning model down the hierarchical structure to machine learning models nodes that are authorized for performing local training of machine learning models (step 914). The process then proceeds to step 904 as described above. With reference again to step 910, if another round training is not to be performed, the process terminates.

In one illustrative example, the initial weights in local machine learning models is from the propagation of the initial primary weights in the global machine learning model to the local machine learning models. In other illustrative examples, the initial weights in the local machine learning models can be assigned based on particular nodes.

Figure 10:
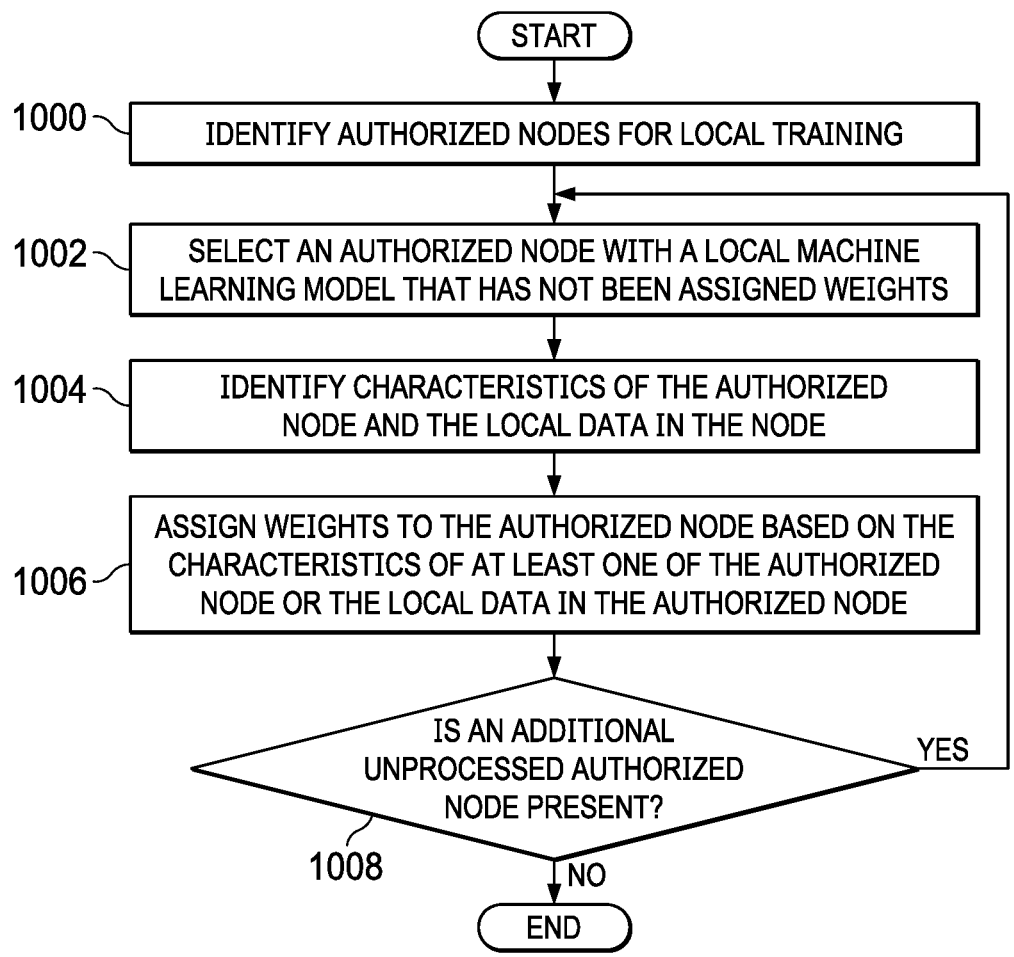
FIG. 10 is a flowchart of a process for assigning weights to local machine learning models in accordance with an illustrative embodiment.

With reference next to FIG. 10, a flowchart of a process for assigning weights to local machine learning models is depicted in accordance with an illustrative embodiment. The process in FIG. 10 can be implemented in hardware, software, or both. When implemented in software, the process can take the form of program code that is run by one of more processor units located in one or more hardware devices in one or more computer systems. For example, the process can be implemented in by training manager 206 in computer system 204 in FIG. 2.

The process begins by identifying authorized nodes for local training (step 1000). The process selects an authorized node with a local machine learning model that has not been assigned weights (step 1002).

The process identifies characteristics of the authorized node and the local data in the node (step 1004). The characteristics of a node can include factors that may affect various weights for various parameters including reliability, a rate of generation, a timeliness of the data, relevance, distribution, and a trustworthiness of the data. For example, if procedures for data collection were compromised in the authorized node, a weight for reliability and trustworthiness can be lowered.

The process assigns weights to the authorized node based on the characteristics of at least one of the authorized node or the local data in the authorized node (step 1006). The process determines whether an additional unprocessed authorized node is present (step 1008). If an additional authorized node is present with a local machine learning model that has not been assigned weights, the process returns to step 1002. Otherwise, the process terminates.

The process in FIG. 10 can also be used to adjust weights in subsequent rounds of training local machine learning models. For example, adjustments to the weights can be made after the primary weights have been propagated down to the local machine learning models. These adjustments can be made to take into account changes that may occur in the characteristics of at least one of an authorized or the local data in the authorized noted.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
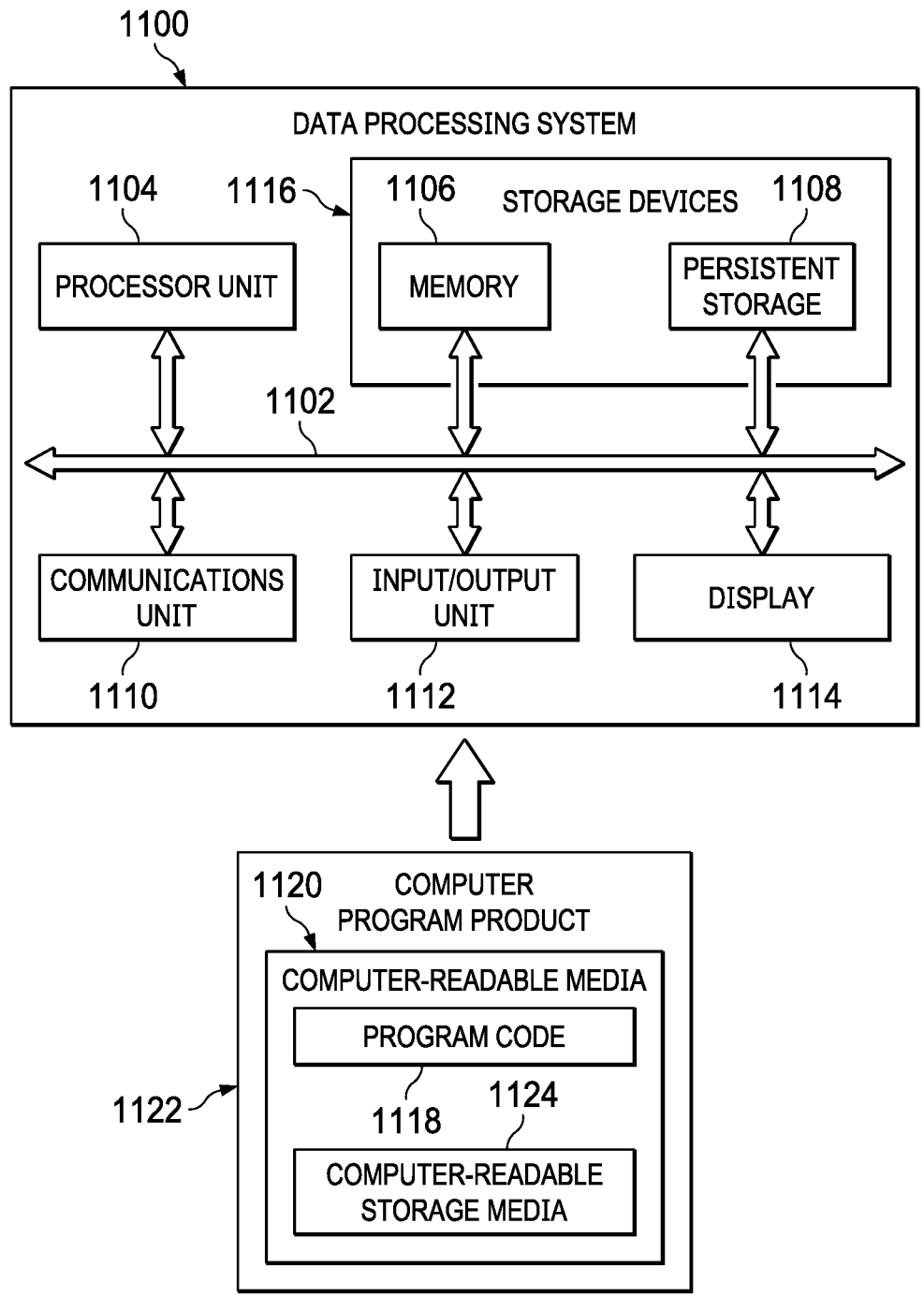
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 104, server computer 106, and client devices 110 in FIG. 1. Data processing system 1100 can also be used to implement computer system 204 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 1104 may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program code 1118 can be located in computer-readable media 1120 in the form of a single storage device or system. In another example, program code 1118 can be located in computer-readable media 1120 that is distributed in multiple data processing systems. In other words, some instructions in program code 1118 can be located in one data processing system while other instructions in program code 1118 can be located in one data processing system. For example, a portion of program code 1118 can be located in computer-readable media 1120 in a server computer while another portion of program code 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Thus, the illustrative embodiments of the present invention provide a computer implemented method, computer system, and computer program product for training a global machine learning model. A hierarchical structure for nodes in which the global machine learning model is located a primary node in the hierarchical structure is identified by a computer system. Authorized nodes in which local data is authorized for use in training in the authorized nodes for a local training of local machine learning models are determined by the computer system. The authorized nodes are located in levels below the primary node. The machine learning models in the authorized nodes are trained by the computer system using the local data in the authorized nodes to generate local model updates to weights in the local machine learning models. The local model updates to the weights are propagated by the computer system upward in the hierarchical structure to the global machine learning model in the primary node. A node receiving local model updates to the weights from nodes from a lower level aggregates the weights in the local model updates received from the nodes in the lower level.

In an illustrative example, a global machine learning model can be trained taking into account a hierarchical structure of nodes that take the form of locations in the environment. The global machine learning model is located in a primary node. This primary node is in the highest level with respect to other nodes in which local training of local machine learning models is performed. In the illustrative example, data sources can be present in one or more of these nodes. With local training of machine learning models, the weights can be propagated upward within the hierarchical structure and aggregated in those to provide a final set of aggregated weights for the global machine learning model. Further, the illustrative example preserves the privacy of data using a policy that can be derived from regulations, access control lists, site permissions, user consent, and other sources. The illustrative examples take into account that the weights can be comprised of parameters including at least one of an operational parameter or a semantic parameter. Further, these parameters can be dynamically assigned or adjusted before or during training of local machine learning models. These parameters can be assigned or adjusted based on characteristics of at least one of the location or data in the location in which local machine learning training is performed.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for training a global machine learning model, the method comprising:

identifying, by a computer system, a hierarchical structure comprising a primary node and a plurality of other nodes, wherein the global machine learning model is located on the primary node in the hierarchical structure and wherein the other nodes are arranged in two or more hierarchical levels of the hierarchical structure hierarchically below the primary node in the hierarchical structure;

determining, by the computer system, authorized nodes hierarchically below the primary node in the hierarchical structure in which local data is authorized for use in training in the authorized nodes for a local training of local machine learning models, wherein a node of the plurality of nodes is determined to be an authorized node by reference to an access control list or reference to a policy regarding use of data sources in the node, wherein the policy is derived from at least one of: a federal regulation, a statute, or user consent;

training, by the computer system, the machine learning models in the authorized nodes using the local data in the authorized nodes to generate local model updates to weights in the local machine learning models; and propagating, by the computer system, the local model updates to the weights upward in the hierarchical structure toward the global machine learning model in the primary node, wherein a node receiving local model updates to the weights from nodes from a lower level of the hierarchical structure aggregates the weights in the local model updates received from the nodes in the lower level.

2. The method of claim 1 further comprising repeating:
identifying, by the computer system, the hierarchical structure for nodes in which the global machine learning model is located in the primary node in the hierarchical structure;
determining, by the computer system, authorized nodes in which the local data is authorized for use in training in the authorized nodes for the local training of the local machine learning models;
training, by the computer system, the machine learning models in the authorized nodes using the local data in the authorized nodes to generate the local model updates to weights in the local machine learning models; and
propagating, by the computer system, the local model updates to the weights upward in the hierarchical structure to the global machine learning model in the primary node, wherein the node receiving local model updates to the weights from the nodes from the lower level aggregates the weights in the local model updates received from the nodes in the lower level,
to repeat training when at least one of a set of convergence criteria for the global machine learning model is unsatisfied, new data is present in the hierarchical structure, the hierarchical structure changes, or a policy for data access permissions changes.

3. The method of claim 2 further comprising:
propagating, by the computer system, primary weights in the global machine learning model to local machine learning models in the authorized nodes in the hierarchical structure prior to repeating training, wherein the primary weights are used when locally training the local machine learning models.

4. The method of claim 1, wherein determining, by the computer system, the authorized nodes in which the local data is authorized for use in training in the authorized nodes for the local training of the local machine learning models comprises:
checking, by the computer system, data access permissions in the nodes in levels below the primary node; and
selecting, by the computer system, a selected node in the nodes in the level below the primary node for inclusion in the authorized nodes when a data access permission for the node allows using data at the node for local training of a machine learning model.

5. The method of claim 1, wherein training generates local updates to weights in the local machine learning models, and wherein generated weights comprise at least one of a quality parameter for the data, an operational parameter for the data, or a semantic parameter for the data.

6. The method of claim 5, wherein the operational parameter is one of reliability, a rate of generation, and a timeliness of the data and wherein the semantic parameter is one of relevance, distribution, and a trustworthiness of the data.

7. The method of claim 1, wherein the nodes are selected from at least one of a geographic location, a building, a data center, a computer, smart glasses, a tablet computer, a client computer, a server computer, a computing device, or an Internet of Things device.

8. A machine learning model training system comprising:
a computer system comprising a plurality of nodes, each node comprising one or more processors, wherein the computer system:
identifies a hierarchical structure comprising a primary node and a plurality of other nodes, wherein a global machine learning model is located in the primary node in the hierarchical structure and wherein the other nodes are arranged in two or more hierarchical levels of the hierarchical structure hierarchically below the primary node in the hierarchical structure;
determines authorized nodes hierarchically below the primary node in the hierarchical structure in which local data is authorized in the authorized nodes for a local training of local machine learning models, wherein a node of the plurality of nodes is determined to be an authorized node by reference to an access control list or reference to a policy regarding use of data sources in the node, wherein the policy is derived from at least one of: a federal regulation, a statute, or user consent;
trains the machine learning models in the authorized nodes using the local data in the authorized nodes to generate local model updates to weights in the local machine learning models; and
propagates the local model updates to the weights upward in the hierarchical structure toward the global machine learning model in the primary node, wherein a node receiving local model updates to the weights from nodes from a lower level of the hierarchical structure aggregates the weights in local model updates received from the nodes in the lower level.

9. The machine learning model training system of claim 8, wherein the computer system repeats:
identifying the hierarchical structure for nodes in which the global machine learning model is located in the primary node in the hierarchical structure;
determining authorized nodes in which the local data is authorized for use in training in the authorized nodes for the local training of the local machine learning models;
training the machine learning models in the authorized nodes using the local data in the authorized nodes to generate the local model updates to weights in the local machine learning models; and
propagating the local model updates to the weights upward in the hierarchical structure to the global machine learning model in the primary node wherein the node receiving local model the updates to the weights from the nodes from the lower level aggregates the weights in the local model updates received from the nodes in the lower level,
to repeat training when at least one of a set of convergence criteria for the global machine learning model is unsatisfied, new data is present in the hierarchical structure, the hierarchical structure changes, or a policy for data access permissions changes.

10. The machine learning model training system of claim 9, wherein the computer system propagates primary weights in the global machine learning model to local machine learning models in the authorized nodes in the hierarchical structure prior to repeating training, wherein the primary weights are used when locally training the local machine learning models.

11. The machine learning model training system of claim 8, wherein in determining the authorized nodes in which the local data is authorized for use in training in the authorized nodes for the local training of the local machine learning models, the computer system checks data access permissions in the nodes in levels below the primary node and selects a selected node in the nodes in the level below the primary node for inclusion in the authorized nodes when a data access permission for the node allows using data at the node for local training of a machine learning model.

12. The machine learning model training system of claim 8, wherein training generates local updates to weights in the local machine learning models, and wherein generated weights comprise at least one of a quality parameter for the data, an operational parameter for the data, or a semantic parameter for the data.

13. The machine learning model training system of claim 12, wherein the operational parameter is one of reliability, a rate of generation, and a timeliness of the data and wherein the semantic parameter is one of relevance, distribution, and a trustworthiness of the data.

14. The machine learning model training system of claim 8, wherein the nodes are selected from at least one of a geographic location, a building, a data center, a computer, smart glasses, a tablet computer, a client computer, a server computer, a computing device, or an Internet of Things device.

15. A computer program product for training a global machine learning model, the computer program product comprising:
a computer-readable storage media;
first program code, stored on the computer-readable storage media, for identifying a hierarchical structure comprising a primary node and a plurality of other nodes, wherein the global machine learning model is located in the primary node in the hierarchical structure;
second program code, stored on the computer-readable storage media, for determining authorized nodes hierarchically below the primary node in the hierarchical structure in which local data is authorized for use in training in the authorized nodes for a local training of local machine learning models, wherein a node of the plurality of nodes is determined to be an authorized node by reference to an access control list or reference to a policy regarding use of data sources in the node, wherein the policy is derived from at least one of: a federal regulation, a statute, or user consent;
third program code, stored on the computer-readable storage media, for training the machine learning models in the authorized nodes using the local data in the authorized nodes to generate local model updates to weights in the local machine learning models; and
fourth program code, stored on the computer-readable storage media, for propagating the local model updates to the weights upward in the hierarchical structure toward the global machine learning model in the primary node wherein a node receiving local model the updates to the weights from nodes from a lower level of the hierarchical structure aggregates the weights in the local model updates received from the nodes in the lower level.

16. The computer program product of claim 15 further comprising:
fifth repeating program code, stored on the computer-readable storage media, for repeating execution of the first program code, the second program code, the third program code, and the fourth program code to repeat training when at least one of a set of convergence criteria for the global machine learning model is unsatisfied, new data is present in the hierarchical structure, the hierarchical structure changes, or a policy for data access permissions changes.

17. The computer program product of claim 16 further comprising:
sixth program code, stored on the computer-readable storage media, for propagating primary weights in the global machine learning model to local machine learning models in the authorized nodes in the hierarchical structure prior to repeating training, wherein the primary weights as used when locally training the local machine learning models.

18. The computer program product of claim 15, wherein the second program code comprises:
program code, stored on the computer-readable storage media, for checking data access permissions in the nodes in levels below the primary node; and
program code, stored on the computer-readable storage media, for selecting a selected node in the nodes in the level below the primary node for inclusion in the authorized nodes when a data access permission for the node allows using data at the node for local training of a machine learning model.

19. The computer program product of claim 15, wherein training generates local updates to weights in the local machine learning models, and wherein generated weights comprise at least one of a quality parameter for the data, an operational parameter for the data, or a semantic parameter for the data.

20. The computer program product of claim 19, wherein the operational parameter is one of reliability, a rate of generation, and a timeliness of the data, and wherein the semantic parameter is one of relevance, distribution, and a trustworthiness of the data.

* * * * *